US011711390B1

(12) United States Patent
Van Horenbeeck et al.

(10) Patent No.: US 11,711,390 B1
(45) Date of Patent: *Jul. 25, 2023

(54) TECHNIQUES FOR DATA ROUTING AND MANAGEMENT USING RISK CLASSIFICATION AND DATA SAMPLING

(71) Applicant: Amazon Technologies, Inc., Seattle, WA (US)

(72) Inventors: Maarten Van Horenbeeck, Seattle, WA (US); Christopher Michael Anderson, Lynnwood, WA (US); Katharine Nicole Harrison, University Place, WA (US); Matthew Ryan Jezorek, Maple Valley, WA (US); Jon Arron McClintock, Seattle, WA (US); Tushaar Sethi, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,150

(22) Filed: Apr. 14, 2022

Related U.S. Application Data

(60) Continuation of application No. 16/670,411, filed on Oct. 31, 2019, now Pat. No. 11,310,251, which is a
(Continued)

(51) Int. Cl.
*H04L 29/06* (2006.01)
*H04L 9/40* (2022.01)
(Continued)

(52) U.S. Cl.
CPC ......... *H04L 63/1425* (2013.01); *G06N 20/00* (2019.01); *H04L 45/70* (2013.01); *H04L 63/1433* (2013.01)

(58) Field of Classification Search
CPC . H04L 63/1425; H04L 45/70; H04L 63/1433; G06N 20/00
See application file for complete search history.

(56) References Cited

U.S. PATENT DOCUMENTS 7,937,761 B1    5/2011  Bennett
7,966,659 B1 *  6/2011  Wilkinson .......... H04L 63/0209
                                            726/25
(Continued)

FOREIGN PATENT DOCUMENTS

WO        2007019349 A2     2/2007

OTHER PUBLICATIONS

M. H. Bhuyan, D. K. Bhattacharyya and J. K. Kalita, "Network Anomaly Detection: Methods, Systems and Tools," in IEEE Communications Surveys & Tutorials, vol. 16, No. 1, pp. 303-336, First Quarter 2014, doi: 10.1109/SURV.2013.052213.00046. (Year: 2014).*
(Continued)

*Primary Examiner* — Shawnchoy Rahman
(74) *Attorney, Agent, or Firm* — Davis Wright Tremaine LLP

(57) ABSTRACT

Techniques described and suggested herein include various systems and methods for determining risk levels associated with transiting data, and routing portions of the data in accordance with the determined risk levels. For example, a risk analyzer may apply risk classifiers to transiting data to determine overall risk levels of some or all of the transiting data. A traffic router may route transiting data according to determined risk profiles for the data. A sandbox may be implemented to compare, for a given input, expected and observed outputs for a subset of transiting data, so as to determine risk profiles associated with at least the subset.

17 Claims, 9 Drawing Sheets

Related U.S. Application Data division of application No. 15/592,058, filed on May 10, 2017, now Pat. No. 10,511,619, which is a division of application No. 14/574,306, filed on Dec. 17, 2014, now Pat. No. 9,661,011.

(51) Int. Cl.
 *G06N 20/00* (2019.01)
 *H04L 45/00* (2022.01)

(56) References Cited

U.S. PATENT DOCUMENTS

| | | | |
|---|---|---|---|
| 8,533,840 B2 | 9/2013 | Redlich et al. | |
| 9,026,644 B2 | 5/2015 | Parker et al. | |
| 9,240,996 B1 | 1/2016 | Sinnema | |
| 9,369,409 B2 | 6/2016 | Hu et al. | |
| 9,705,914 B2 | 7/2017 | Di Pietro et al. | |
| 9,894,088 B2 | 2/2018 | Ward et al. | |
| 2004/0088542 A1 | 5/2004 | Daude et al. | |
| 2007/0011741 A1 | 1/2007 | Robert et al. | |
| 2008/0189788 A1 | 8/2008 | Bahl | |
| 2008/0312819 A1 | 12/2008 | Banerjee | |
| 2010/0257605 A1* | 10/2010 | McLaughlin | H04L 63/1425 726/22 |
| 2012/0096257 A1 | 4/2012 | Li et al. | |
| 2012/0124666 A1 | 5/2012 | Kim et al. | |
| 2012/0158633 A1 | 6/2012 | Eder | |
| 2013/0174256 A1 | 7/2013 | Powers | |
| 2013/0305357 A1 | 11/2013 | Ayyagari et al. | |
| 2017/0236080 A1 | 8/2017 | Singh et al. | |

OTHER PUBLICATIONS

Hofmeyr, Steven A., Stephanie Forrest, and Anil Somayaji. "Intrusion detection using sequences of system calls." Journal of computer security 6.3 (1998): 151-180. (Year: 1998).*

Calvet et al., "Isolated Virtualised Clusters: Testbeds for High-Risk Security Experimentation and Training," Third Workshop on Cyber Security Experimentation and Test (CSET '10), Aug. 9, 2010, 8 pages.

Kreutz et al, "Towards Secure and Dependable Software-defined Networks," Proceedings of the second ACM SIGCOMM workshop on Hot topics in software defined networking, 2013, 6 pages.

Patcha et al, "An Adaptive Sampling Algorithm with Applications to Denial-of-Service Attack Detection," Proceedings of 15th International Conference on Computer Communications and Networks, 2006, 6 pages.

* cited by examiner

TECHNIQUES FOR DATA ROUTING AND MANAGEMENT USING RISK CLASSIFICATION AND DATA SAMPLING

CROSS REFERENCE TO RELATED APPLICATIONS

This application is a continuation of U.S. patent application Ser. No. 16/670,411, filed. Oct. 31, 2019, entitled "TECHNIQUES FOR DATA ROUTING AND MANAGEMENT USING RISK CLASSIFICATION AND DATA SAMPLING," which is a divisional of U.S. patent application Ser. No. 15/592,058, filed May 10, 2017, now U.S. Pat. No. 10,511,619, entitled "TECHNIQUES FOR DATA ROUTING AND MANAGEMENT USING RISK CLASSIFICATION AND DATA SAMPLING, which is a divisional of U.S. patent application Ser. No. 14/574,306, filed Dec. 17, 2014, now U.S. Pat. No. 9,661,011, entitled "TECHNIQUES FOR DATA ROUTING AND MANAGEMENT USING RISK CLASSIFICATION AND DATA SAMPLING," the contents of which are incorporated by reference herein in their entire.

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and to adaptively satisfy their computing needs, whereby the computing and storage resources used by the content providers and online merchants are added or removed from a large pool provided by a computing resource provider depending on their needs.

However, as the number of entities involved in providing network computing and storage services increases in tandem with the number of entities utilizing such services, the amount of malicious data intended to penetrate the services (as well as to access data secured thereon) is also increasing. The complexity and sheer throughput of the implemented resources makes it difficult to build and implement detection and mitigation regimes that efficiently handle malicious data without affecting legitimate data. Additionally, customers' experience with network computing and storage services may be adversely affected by an overzealous implementation of such detection and mitigation regimes.

BRIEF DESCRIPTION OF THE DRAWINGS

Various embodiments in accordance with the present disclosure will be described with reference to the drawings, in which:

FIG. 8 schematically illustrates an example of a customer connected to a computing resource service provider, in accordance with some embodiments; and.

DETAILED DESCRIPTION

Figure 1:
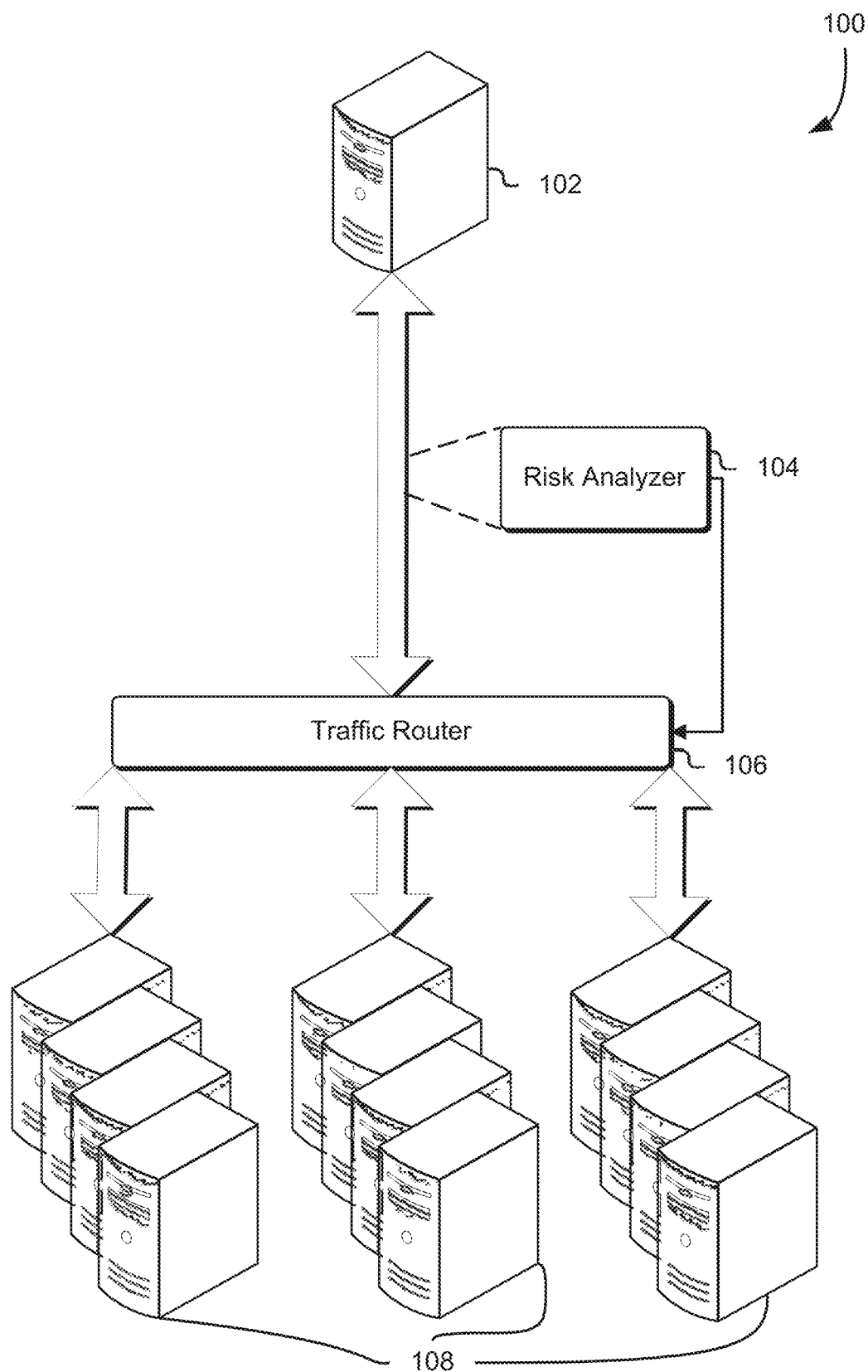
FIG. 1 schematically illustrates an example environment for routing data by utilizing a risk analyzer to inform a traffic router, in accordance with some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include various systems and methods for determining risk levels associated with transiting data, and routing portions of the data in accordance with the determined risk levels. For example, a risk analyzer is described. The risk analyzer may implement one or more risk classifiers, each of which may determine risk level components with respect to one or more designated attributes of the data. The risk analyzer may analyze data on, for example, a per network packet basis. The risk classifiers may be connected, such as in a graph or tree, such that determinations of one of the risk classifiers (or a combination of the risk classifiers) may influence the outcome of determinations of other risk classifiers. In some embodiments, the risk analyzer may also concatenate multiple quanta of data, such as network packets, into traffic flows according to common or related risk profiles, or other criteria. In some embodiments, the risk analyzer combines, such as by simple summing, normalization, or other statistical and/or mathematical method, the determined risk level components into an overall risk level for the analyzed data. In embodiments where multiple analyzed data quanta are combined into traffic flows, the overall risk level for each analyzed quantum is combined by the risk analyzer to generate one or more risk profiles associated with those traffic flows.

In some embodiments, a traffic router routes data to one or more selected hosts of a plurality, based on risk profiles associated with the data. In some embodiments, the risk profiles may be generated by a risk analyzer, such as that described immediately above. The plurality of hosts may be generally separated into a general population of hosts and a set of quarantined hosts that are isolated in some fashion from the general population of hosts. The quarantined hosts may additionally implement further mitigation measures to handle data with a higher likelihood of maliciousness, such as may be determined by the risk analyzer (and memorialized in the risk profiles). In some embodiments, data determined to have a low likelihood of being malicious may be routed normally, such as to any of the general population of hosts. Data with a higher likelihood of being malicious may be routed to one or more of a subset of the general population of hosts that is separated (e.g., in either physical or data protection terms) from hosts within the general population that harbor confidential data, or data that is otherwise determined by some entity to be sensitive. Data that is very likely to be malicious may be routed to the quarantined hosts which, as previously mentioned, may implement additional mitigation measures to handle such data.

In some embodiments, a traffic sample is determined from an overall flow of data and replicated so as to be analyzed by a sandbox. The sandbox may include one or more hosts that analyze the replicated traffic sample so as to provide controlled or known inputs to the traffic sample, and compare the observed outputs to expected outputs for those inputs. In some embodiments, the replicated traffic sample, and the sandbox, are implemented in parallel to the ordinary flow of data, so as not to interrupt or otherwise affect the flow of data, e.g., to the intended destination. In some embodiments, the comparison between the observed outputs and. the expected outputs may be used to take various actions, such as providing training data for a traffic router or a risk analyzer (so as to improve their various functionalities), causing a risk analyzer to perform analysis on some or all of the data from which the traffic sample was selected, causing a traffic router to block or route some or all of the data from which the sample was selected, and the like.

FIG. 1 schematically illustrates an example environment 100 for routing data by utilizing a risk analyzer to inform a traffic router, in accordance with some embodiments. Data transiting from one or more source entities 102 is processed, using techniques described in further detail herein, by a risk analyzer 104. The transiting data is routed by a traffic router 106 to one or more of a plurality of destination entities 108. The risk analyzer 104 interacts with the traffic router 106, such as via programmatic methods, so as to enable the traffic router to appropriately route some or all of the data according to determinations made by the risk analyzer, as further described herein.

The source entities 102, as well as the destination entities 108, may include any entity capable of providing and/or receiving data to/from another entity, such as over a network, and by way of example may include physical computing devices and servers, laptops, smartphones, virtual computing systems (such as may be provided by one or more resources of a computing resource service provider), computing services, and the like. As used herein, the term "source" is used interchangeably with "source entity/ies," while the terms "destination" and "host" are used interchangeably with "destination entity/ies."

The data may be of any type and may transit in any fashion appropriate to the implementation. For example, the data may transit as traffic over a network, and may be transacted via one or more network protocols at any layer or other level of abstraction. Examples include application layer protocols such as BGP, AAA/AAAS, DNS, FTP, HTTP, IMAP, LDAP, MGCP, NNTP, NTP, POP, ONC/RPC, RADIUS, RTP, RTSP, RIP, SIP, SMTP, SNMP, SSH, TACACS, Telnet, TLS, SSL, XMPP, and the like. Other examples include transport layer protocols such as TCP, UDP, DCCP, SCTP, RSVP, and the like. Yet other examples include Internet layer protocols, such as IP (including IPv4 and IPv6), ICMP (including ICMPv6, ECP, IGMP, IPsec, and the like. Still other examples include link layer protocols such as ARP, NDP, OSPF, L2TP, PPP, MAC, and the like. In some embodiments, the data may be transmitted as a series of packets or other quanta, such as network packets, that may conform with one or more of network protocols, such as one of the network protocols enumerated immediately above. The attributes of such quanta (e.g., length, format, metadata) may be defined by one or more of the network protocols used, or may be selected, such as by any component of the traffic router 106 and/or the risk analyzer 104, independently of the network protocol(s) with which the data conforms.

The risk analyzer 104 may be any computing resource or collection of computing resources that are capable of applying calculations or transformations to transiting data, such as network traffic. For example, the risk analyzer 104 may include hardware network appliances such as network processors and network routers, hardware computing systems such as servers, application-specific processors (e.g., processors and/or computing systems designed to analyze transiting data), and the like. In some embodiments, the risk analyzer 104 may be implemented in a format other than a hardware device. For example, the risk analyzer 104 may be one or more routines implemented in the software or firmware of a hardware device, or may be a virtual computing system or service, such as that which is provided by a computing resource service provider, described in further detail below.

In some embodiments, the risk analyzer 104 is configurable to apply one or more risk classifiers to the transiting data. In some embodiments, the risk classifiers may include routines, either in software, firmware, or hardware (e.g., of the risk analyzer 104 or other connected entity or resource), that output specific determinations from given inputs, relative to assigned attributes of the data. For example, a given risk classifier may assess, for a quantum of the data (e.g., a network packet), the state of the quantum of data with respect to an attribute of that quantum of data. States, as well as attributes, may be either binary or open-ended (e.g., digital or analog).

In some embodiments, a plurality of such risk classifiers may be implemented and. applied by the risk analyzer 104, and applied risk classifiers may individually generate a risk level component that represents (e.g., numerically), a contribution of each attribute analyzed toward the likelihood that the analyzed quantum of data is malicious. The risk level component may be in any denomination or metric, such as a simple integer score, a contribution to a likelihood of maliciousness (whether positive or negative), and the like. The contributions of each applied risk classifier, and therefore the magnitude and effect of each risk level component, may be statically defined at the time of implementation, or, in some embodiments, may be dynamic (e.g., dependent on other factors). In embodiments where some or all of the risk level components are dynamic in nature, the weighting, values, contributions, and the like may be influenced by any appropriate factor or combination of factors. For example, in some embodiments, some or all of the risk classifiers may be interconnected, and in such embodiments, the risk level components of a given risk classifier may vary as a result of the outcome of some or all of the other risk classifiers to which is connected. Other dynamic factors may include environmental variables (e.g., the overall risk environment at a given time of the destination and/or the source), temporal effects, traffic volumes, and the like.

The risk level components may be combined to generate an overall risk level for the quantum of data analyzed by the risk analyzer 104. The combination of the risk level components may be performed, e.g., by the risk analyzer itself, or by any appropriate entity (e.g., a computing entity of the computing resource service provider), using any appropriate mathematical, statistical, or stochastic approach (or combination of such approaches). For example, the risk level components may be normalized, extrapolated (e.g., linearly or polynomially), summed, averaged, and the like. In certain embodiments, a plurality of determined overall risk levels (e.g., for a plurality of respective data quanta), may be combined, such as by the risk analyzer 104, into a risk profile for the plurality of respective data quanta. The plurality of respective data quanta may, in some embodiments, be considered a traffic flow, and such traffic flows may be grouped according for any reason. For example, the risk analyzer 104 may concatenate a plurality of network packets having similar overall risk levels, or having similarities amongst a particular set of risk level components associated therewith, into one or more traffic flows.

In some embodiments, the risk analyzer 104 communicates, such as over a network and/or using a programmatic method (e.g., an application programming interface call, a web service call, or the like), the overall risk levels and/or risk profiles to the traffic router 106. The traffic router 106 may be any computing resource or collection of computing resources capable of routing incoming and/or outgoing data, such as network traffic, to one or more destinations. For example, the traffic router 106 may include hardware network appliances such as network processors and network routers, hardware computing systems such as servers, application-specific processors (e.g., processors and/or computing systems designed to route data), and the like. In some embodiments, the traffic router 106 may be implemented in a format other than a hardware device. For example, the traffic router 106 may be one or more routines implemented in the software or firmware of a hardware device, or may be a virtual computing system or service, such as that which is provided by a computing resource service provider, described in further detail below.

In some embodiments, the traffic router 106 routes the data to a subset of one or more hosts of a plurality of destination hosts 108, according to risk profiles and/or overall risk levels associable to that data. The plurality of destination hosts 108 may include a general population of hosts that are configured to receive data, as well as one or more quarantined hosts that are isolated, computationally, electrically, and/or physically, from the general population of hosts. In some embodiments, the traffic router 106 may, according to risk profiles and/or overall risk levels associable to the data, increase network distance between the hosts along a path chosen by the traffic router 106 in accordance with the risk profile and/or overall risk levels (e.g., network path), and a set of hosts having sensitive data. In some embodiments, the hosts in a path so chosen may be part of a population of hosts that also includes hosts having sensitive data, from which malicious or potentially malicious data is to be isolated.

For example, if the traffic router 106 receives a risk profile for a given traffic flow that indicates that the traffic flow is below a predetermined likelihood (e.g., percent chance) of being malicious, the traffic router 106 may route that traffic flow to any of the general population of hosts. As another example, if the traffic router 106 receives a risk profile for a given traffic flow that indicates that the traffic flow is above that predetermined likelihood, but below a different predetermined likelihood (above which the traffic router 106 may deem the associated traffic flow as being highly likely to be malicious), the traffic router 106 may opt to route the traffic flow via a path that includes a subset of the general population of hosts that is isolated from one or more hosts in the general population that contain confidential data or other data designated by, e.g., an entity of a computing resource service provider or a customer thereof, as sensitive. As yet another example, if the traffic router 106 receives a risk profile for a given traffic flow that indicates that the traffic flow is highly likely to be malicious, the traffic flow may be directed by the traffic router 106 to the quarantined hosts, which, in some embodiments, may implement additional mitigation measures and/or workflows that are directed to handling malicious data. In some embodiments, traffic flow that is malicious or highly likely to be malicious may be routed by the traffic router 106 via a path that is isolated from some or all of the hosts of the general population. In some embodiments, such mitigation measures and/or workflows may be tailored to the specific nature of maliciousness suspected of the data, and information relating to the nature of the data's maliciousness (such as risk level components and other information received from the risk analyzer 104) may be used by, e.g., the quarantined hosts or the traffic router 106, to configure and/or generate such mitigation measures and/or workflows.

Figure 2:
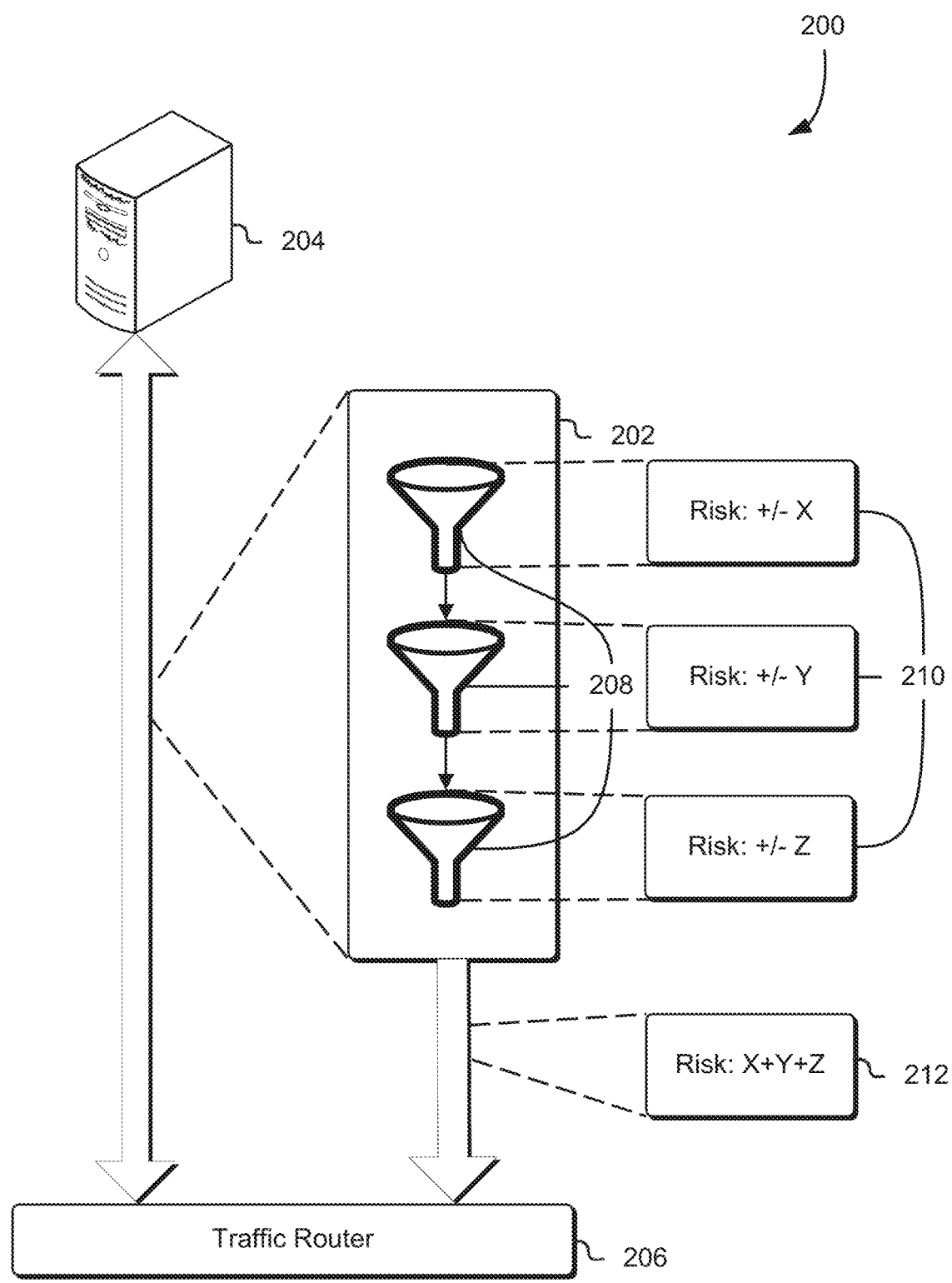
FIG. 2 schematically illustrates example workflows for determining overall risk levels and risk profiles based on the application of risk classifiers to data, in accordance with some embodiments.

FIG. 2 schematically illustrates example workflows 200 for determining overall risk levels and risk profiles based on the application of risk classifiers to data, in accordance with some embodiments. A risk analyzer 202, which may be similar to the risk analyzer 104 described above in connection with FIG. 1, analyzes data (such as network traffic) transiting from a source (or plurality of sources) 204 to a destination, such as may be connected to a traffic router 206. The source 204 may be similar to the source entities 102 described above in connection with FIG. 1. The traffic router 206 may be similar to the traffic router 106 described above in connection with FIG. 1.

As previously discussed, the data may be of any type and may transit in any fashion appropriate to the implementation. Also as previously discussed, in some embodiments, the data. may be transmitted as a series of packets or other quanta, such as network packets, that may conform with one or more of network protocols, such as one of the network protocols enumerated immediately above. The attributes of such quanta. (e.g., length, format, metadata) may be defined by one or more of the network protocols used, or may be selected, such as by any component of the traffic router 106 and/or the risk analyzer 104, independently of the network protocol(s) with which the data conforms, While network packets are a focus of this disclosure, any quanta of data, and any type of data capable of being quantized, may be subject to the techniques disclosed as within scope of the present disclosure.

As previously discussed, the risk analyzer 202 may be any computing resource or collection of computing resources that are capable of applying calculations or transformations to transiting data, such as network traffic. In some embodiments, the risk analyzer 202 is configurable to apply one or more risk classifiers 208 to the transiting data. In some embodiments, the risk classifiers 208 may include routines, either in software, firmware, or hardware (e.g., of the risk analyzer 202 or other connected entity or resource), that output specific determinations from given inputs, relative to assigned attributes of the data. For example, a given risk classifier 208 may assess, for a quantum of the data (e.g., a network packet), the state of the quantum of data with respect to an attribute of that quantum of data. States, as well as attributes, may be either binary or open-ended (e.g., digital or analog). By way of example, a risk classifier may assess the source reputation of a given network packet (which, as may be appreciated, may be an open-ended attribute of that network packet), and as a result, may determine that the state of the packet with respect to the assessed attribute (i.e., source reputation) is "source known to be malicious in the past 60 minutes." As another example, a risk classifier may assess whether a given network packet is correctly formed according to a network protocol to which it ostensibly adheres (i.e., a binary attribute), and the result may be that it is (i.e., a binary state). Examples of attributes include packet integrity status, source reputation, network protocol used for the data, destination status (e.g., whether the destination is under attack), request type, packet content, and/or the like. The risk classifiers 208 may, in some embodiments, implement various automated improvement techniques, such as machine learning techniques, that in some of such embodiments may utilize externally provided training data, such as described in further detail herein.

In some embodiments, a plurality of such risk classifiers may be implemented and applied by the risk analyzer 202. The plurality of risk classifiers 208 may be connected in some fashion, such as in a graph, a tree, or the like. In such embodiments, the determinations made by a given risk classifier 208 may rely, in part or in whole, on the determinations of some or all of the risk classifiers 208 to which that risk classifier 208 is interconnected. A subset of some or all of the interconnected risk classifiers may be selected, such as by the risk analyzer 104, to analyze a given quantum of data, based on, e.g., an initial determination by one of the risk classifiers 208 that further analysis by that subset is necessary. As may be contemplated, in embodiments where a plurality of risk classifiers are implemented, only a subset of such risk classifiers may be applied at a given time or for a given data quantum. In certain embodiments, further analysis by other risk classifiers may be skipped or curtailed if a given risk classifier or subset of risk classifiers makes a determination that, e.g., the quantum of data being analyzed is highly likely to be malicious, as further analysis may be unnecessary.

Applied risk classifiers may individually generate a risk level component 210 that represents (e.g., numerically), a contribution of each attribute analyzed toward the likelihood that the analyzed quantum of data is malicious. The risk level component 210 may be in any denomination or metric, such as a simple integer score, a contribution to a likelihood of maliciousness (whether positive or negative), and the like. The contributions of each applied risk classifier 208, and therefore the magnitude and effect of each risk level component 210, may be statically defined at the time of implementation, or, in some embodiments, may be dynamic (e.g., dependent on other factors). In embodiments where some or all of the risk level components 210 are dynamic in nature, the weighting, values, contributions, and the like may be influenced by any appropriate factor or combination of factors. As previously discussed, in some embodiments, some or all of the risk classifiers 208 may be interconnected, and in such embodiments, the risk level components 210 of a given risk classifier 208 may vary as a result of the outcome of some or all of the other risk classifiers 208 to which is connected. Other dynamic factors may include environmental variables (e.g., the overall risk environment at a given time of the destination and/or the source), temporal effects, traffic volumes, and the like.

As previously discussed, the risk level components 210 may be combined to generate an overall risk level 212 for the quantum of data analyzed by the risk analyzer 202. The combination of the risk level components 210 may be performed, e.g., by the risk analyzer 202 itself, or by any appropriate entity (e.g., a computing entity of the computing resource service provider), using any appropriate mathematical, statistical, or stochastic approach (or combination of such approaches). For example, the risk level components 210 may be normalized, extrapolated (e.g., linearly or polynomially), summed, averaged, and the like.

In certain embodiments, a plurality of determined overall risk levels 212 (e.g., for a plurality of respective data quanta), may be combined, such as by the risk analyzer 202, into a risk profile for the plurality of respective data quanta. The plurality of respective data quanta may, in some embodiments, be considered a traffic flow, and such traffic flows may be grouped according for any reason. For example, the risk analyzer 202 may concatenate a plurality of network packets having similar overall risk levels, or having similarities amongst a particular set of risk level components 210 associated therewith, into one or more traffic flows.

Also as previously discussed, in some embodiments, the risk analyzer 202 communicates, such as over a network and/or using a programmatic method (e.g., an application programming interface call, a web service call, or the like), the overall risk levels 212 and/or risk profiles to the traffic router 206 for further processing. As described, the traffic router 206 may be any computing resource or collection of computing resources capable of routing incoming and/or outgoing data, such as network traffic, to one or more destinations. As discussed in more detail elsewhere in this disclosure, the traffic router 206 may make various routing decisions for the data quanta or traffic flows associated with the overall risk levels 212 or risk profiles, either by dynamically routing the data quanta and/or traffic flows to a destination appropriate for the associated risk profile/overall risk level 212, or by directing the data quanta and/or traffic flows in accordance with preimplemented static routes.

Figure 3:
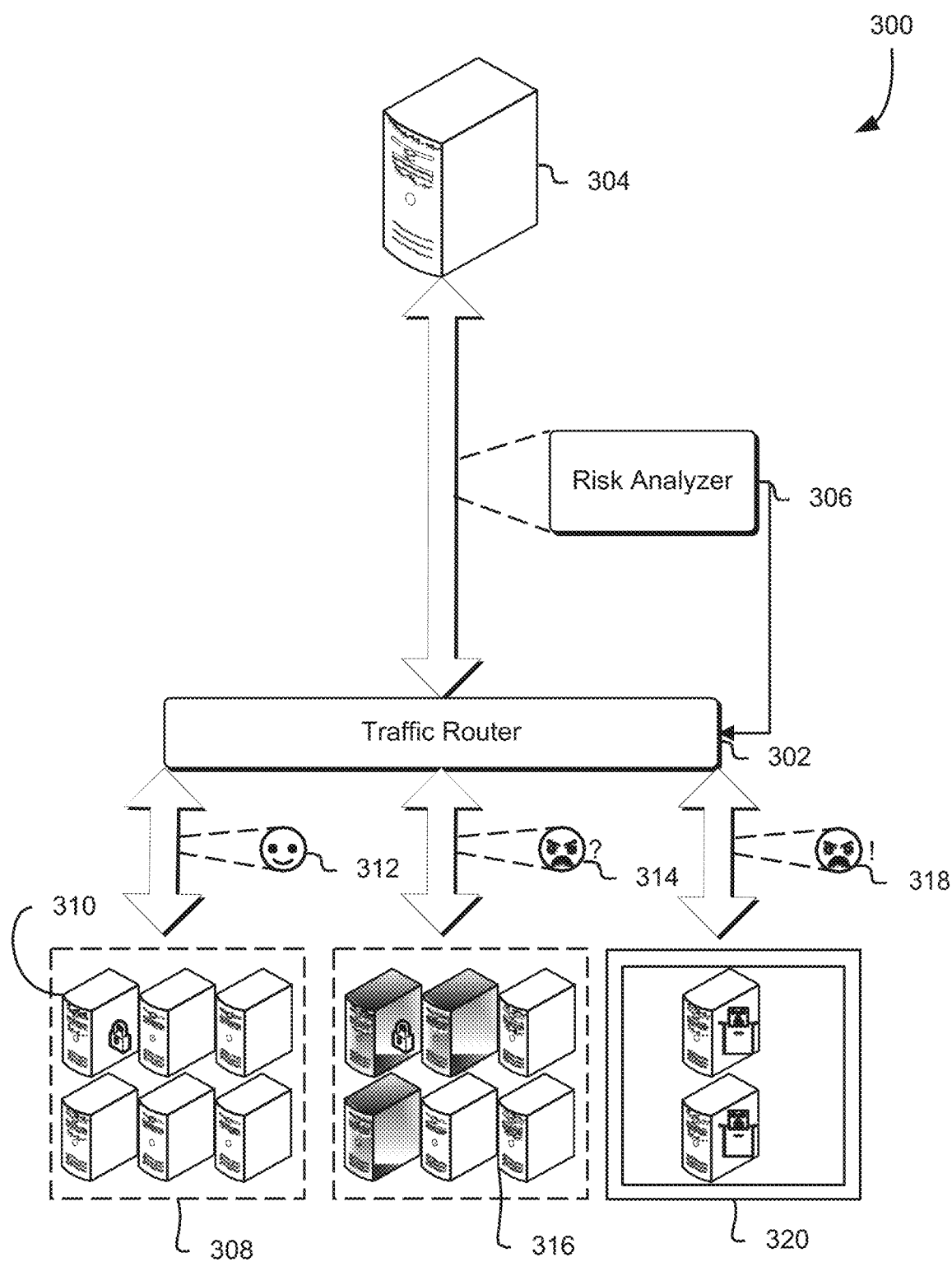
FIG. 3 schematically illustrates example workflows for routing data in accordance with risk profiles associated with the routed data, in accordance with some embodiments.

FIG. 3 schematically illustrates example workflows 300 for routing data in accordance with risk profiles associated with the routed data, in accordance with some embodiments. A traffic router 302 may implemented to route data, such as network traffic, received by, e.g., one or more resources of a computing resource service provider, from one or more sources 304. The traffic router 302 may route the data based on information relating to risk levels and/or risk profiles associated with that data, such as may be received from a risk analyzer 306. The traffic router 302 may be similar in functionality an/or implementation to the traffic router described in connection with FIGS. 1 and 2 above. The source(s) 304 may be similar in functionality and/or implementation to the source(s) described in connection with FIGS. 1 and 2 above. The risk analyzer 306 may be similar in functionality and/or implementation to the risk analyzer described in connection with FIGS. 1 and 2 above.

Similarly to previously discussed, the traffic router 302 may be any computing resource or collection of computing resources capable of routing incoming and/or outgoing data, such as network traffic, to one or more destinations, such as destination entities and/or hosts, For example, the traffic router 302 may include hardware network appliances such as network processors and network routers, hardware computing systems such as servers, application-specific processors (e.g., processors and/or computing systems designed to route data), and the like. In some embodiments, the traffic router 302 may be implemented in a format other than a hardware device. For example, the traffic router 302 may be one or more routines implemented in the software or firmware of a hardware device, or may be a virtual computing system or service, such as that which is provided by a computing resource service provider, described in further detail below.

In some embodiments, the traffic router 302 may be implemented in addition to an existing entity that routes the data to the hosts. For example, a network routing device may provide existing static routes for the data based on some set of criteria, e.g., source location, network address, load balancing status, and the like. In embodiments where the traffic router 302 is implemented in addition to such a network routing device, the traffic router 302 may utilize the existing static routes to route data according to, e.g., overall risk level and/or risk profiles of that data.

Similarly to previously discussed, in some embodiments, a risk analyzer 306 communicates, such as over a network and/or using a programmatic method (e.g., an application programming interface call, a web service call, or the like), overall risk levels and/or risk profiles associated with transiting data (or quanta thereof) to the traffic router 106. Also as previously discussed, in some embodiments, the risk analyzer 306 analyzes the overall risk levels and/or risk profiles relative to one or more attributes of the transiting data, At a time after analysis, the risk analyzer 306 may communicate such information to the traffic router 302 for further determination of how the data should be routed. In some embodiments, the traffic router 302 routes the data to either a general population 308 of a plurality of hosts 310, and/or to one or more quarantined hosts 320, depending on the risk profiles and/or overall risk levels associated with that data. The general population of hosts 308 may be, for example, a plurality of partially or fully interchangeable hosts capable of being configured receive data. The one or more quarantined hosts 320 may be isolated, computationally, electrically, and/or physically, from the general population of hosts, so as to minimize or eliminate any effects upon the general population of hosts from the receipt of malicious data.

As previously discussed, the data may be network traffic, and may be organized into traffic flows having one or more shared traits, such as risk profiles, risk level components, overall risk levels, attributes, and the like. Such traffic flows may include a plurality of network packets, and the concatenation of data quanta into traffic flows may be performed by the risk analyzer 306, in a fashion similar to that described elsewhere in this disclosure.

For example, if the traffic router 302 receives a risk profile for a given traffic flow that indicates that the traffic flow is below a predetermined likelihood (e.g., percent chance) of being malicious, the traffic router 302 may determine that the associated traffic flow is not malicious 312, and accordingly route that traffic flow using a path, such as a network path, that includes any host 310 of the general population of hosts 308. As another example, if the traffic router 302 receives a risk profile for a given traffic flow that indicates that the traffic flow is above that predetermined likelihood, but below a different predetermined likelihood (above which the traffic router 302 may deem the associated traffic flow as being highly likely to be malicious), the traffic router 302 may determine that the traffic flow is suspicious 314, and accordingly may opt to route the traffic flow via a path that includes a subset 316 of the general population of hosts that is isolated from one or more hosts in the general population that contain confidential data or other data designated by, e.g., an entity of a computing resource service provider or a customer thereof, as sensitive. In some embodiments, such isolation may be the insertion of additional network distance between a host in a path and a host outside the path (e.g., hosts from which the data is intended to be isolated).

Network distance may be increased by adding additional routers, hosts, firewalls, or other virtual, physical, hardware, and/or software computing and/or network devices that physically, electrically, or conceptually separate one data flow from another to a greater degree than if such additions were not made. For example, additional network "hops" may be inserted, such as the inclusion of interstitial network processors that further analyze and/or modify data flowing thereto. As another example, network distance may be increased by routing data to a datacenter or other physical entity housing the hosts that is physically separate from another set of hosts.

In embodiments where the traffic router 302 routes suspicious data 314 to a subset of a general population of hosts, in some of such embodiments, the subset 316 is selected by the traffic router such that the subset is isolated in some way (or the network distance therefrom is increased) from any of the hosts within the general population storing or handling confidential or otherwise sensitive data. Such isolation may be implemented in any appropriate fashion, and the isolation itself may be physical, virtual, topological, and the like. Additionally, the amount of isolation may vary, e.g., based on the nature of the data, its risk profile and/or overall risk level, the type of threat posed, and the like. For example, the traffic router 302 may route somewhat suspicious data to any subset of the general population hosts such that sensitive and malicious data do not intermix. As a further example, a traffic router 302 may route data that is more suspicious to a subset of the general population of hosts that is, e.g., a number of network hops away from any hosts of the general population that carry sensitive data.

If the traffic router 302 receives a risk profile for a given traffic flow that indicates that the traffic flow is highly likely to be malicious 318, the traffic flow may be directed by the traffic router 302 to the quarantined hosts 320. In some embodiments, the quarantined hosts 320 may implement additional mitigation measures and/or workflows that are directed to handling malicious data. For example, such mitigation measures may include additional determination of the specific threat caused by the data, blocking the data from reaching any other host or computing resource connected to the system, notifying system engineers to take further manual action, or the like. In some embodiments, such mitigation measures and/or workflows may be tailored (e.g., automatically, by the traffic router 302 or the quarantined hosts 320) to the specific nature of maliciousness suspected of the data, and information relating to the nature of the data's maliciousness (such as risk level components and other information received from the risk analyzer 306) may be used by, e.g., the quarantined hosts 320 or the traffic router 302, to configure and/or generate such mitigation measures and/or workflows.

In some embodiments, the hosts 320 may be another set of hosts that have an increased network distance from the population of hosts 308, rather than quarantined from such hosts. For example, the hosts 320 along a path chosen by the traffic analyzer for highly suspicious data may have an increased network distance from the hosts 308 than the subset of hosts 316 that may be on a path selected by the traffic analyzer if the data was less suspicious, but not free of suspicion.

Figure 4:
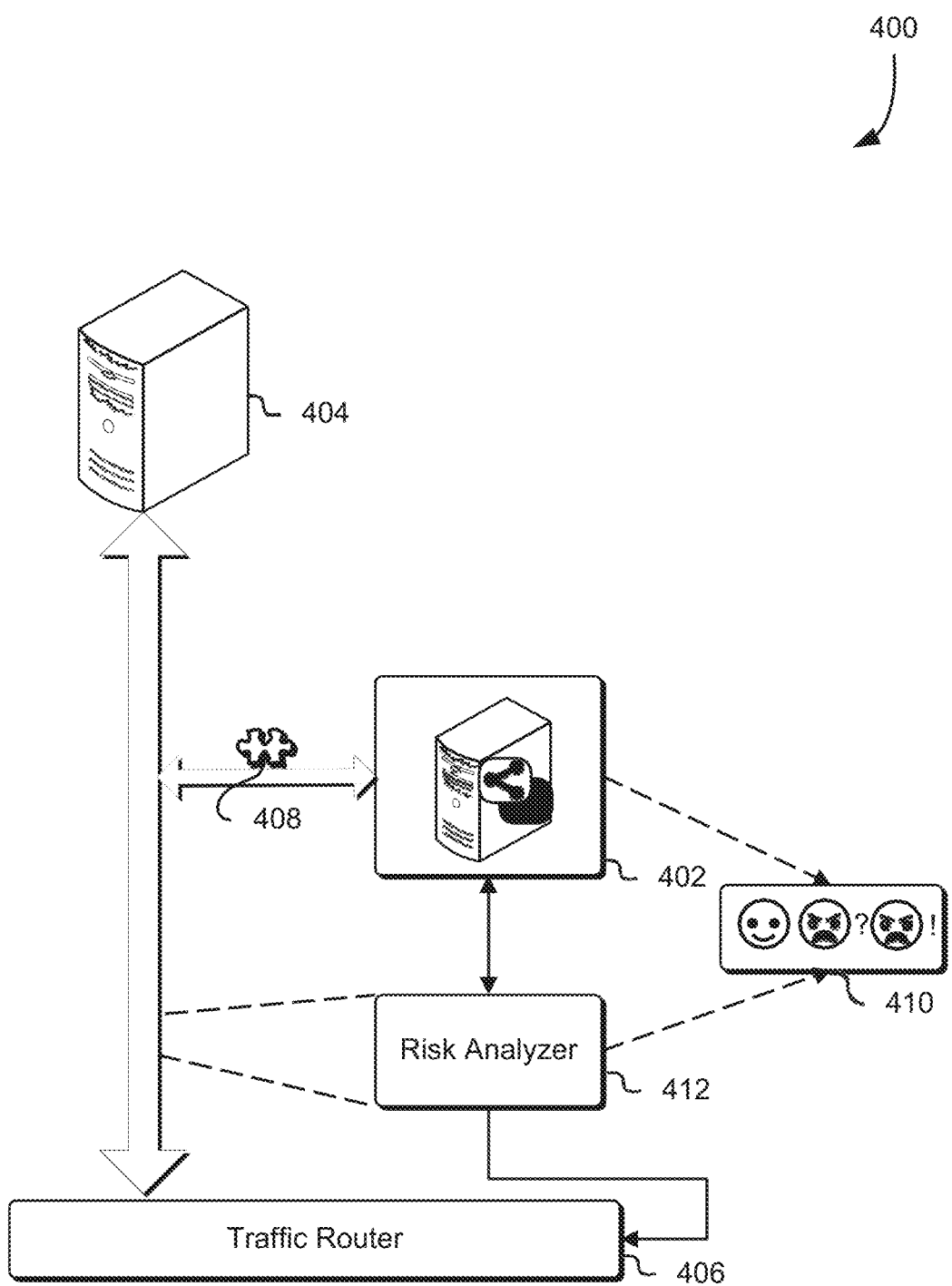
FIG. 4 schematically illustrates example workflows for analyzing sampled data in a sandbox, in accordance with some embodiments.

FIG. 4 schematically illustrates example workflows 400 for analyzing sampled data in a sandbox, in accordance with some embodiments. A sandbox 402 may process, in parallel to another mechanism for data transit (e.g., a network), traffic samples 408 obtained from data transiting from one or more sources 404 to, e.g., a traffic router 406. The sandbox 402 may be entity capable of obtaining and processing network data. For example, the sandbox 402 may include hardware network appliances such as network processors and network routers, hardware computing systems such as servers, application-specific processors (e.g., processors and/or computing systems designed to process network data), and the like. In some embodiments, the sandbox 402 may be implemented in a format other than a hardware device. For example, the sandbox 402 may be one or more routines implemented in the software or firmware of a hardware device, or may be a virtual computing system or service, such as that which is provided by a computing resource service provider, described in further detail below. The source(s) 404, the risk analyzer 412, and the traffic router 406 may be similar in functionality and implementation to similar entities described above in connection with at least FIGS. 1 through 3. The sandbox 402 may be isolated from other components of an implementing system, such as electrically, physically, virtually, or the like.

In some embodiments, the sandbox 402 may select the traffic sample 408, e.g., as a representative of some or all of the data transiting from the source(s) 404 to the destination (e.g., via the traffic router 406). For example, a given traffic flow, such as a traffic flow as described above in connection with FIGS. 1 through 3, may be made up of a plurality of network packets. In such an example, the traffic sample 408 may include one or more of the network packets, such that the sandbox 402 may process the traffic sample 408 and extrapolate or infer one or more behaviors and/or traits of the overall traffic flow. The size of the traffic sample 408 may, in some embodiments, vary based on one or more factors. Such factors may include environmental variables (e.g., the overall risk environment at a given time of the destination and/or the source), temporal effects, traffic volumes, and the like. In some embodiments, traffic profiles and/or overall risk levels, such as determined by the risk analyzer 412, for the traffic flow or similar traffic flows (e.g., those observed at an earlier point in time than the presently analyzed traffic flow), may be used, e.g., by the sandbox, to determine the size of the traffic sample 408. In some embodiments, the size and/or timing of the traffic sample 408 may be determined by an entity other than the sandbox 402, such as by the traffic router 406, the risk analyzer 412, or some other resource of a computing resource service provider. In some embodiments, the traffic sample 408 may be copied (e.g., replicated), from the data transiting from the source(s) 404 to the destination, rather than being removed from the data transiting from the source(s) 404 to the destination, to be processed by the sandbox 402.

In some embodiments, the sandbox 402 provides one or more inputs (e.g., stimuli) to the traffic sample 408 and observes the outputs. The sandbox 402 may determine one or more expected outputs to be used as controls, e.g., behaviors that would be observed of the traffic sample 408 given the inputs if the traffic sample 408 contained no malicious data. Such expected outputs may be determined in connection with various characteristics of the traffic sample 408 or the traffic flow/transiting data from which it derives, such as the network protocol of the traffic sample 408, the intended destination of the traffic sample 408, one or more characteristics of the source of the traffic sample and the like. Similarly, the sandbox 402 may tailor the input(s) to the traffic sample based on the observed or known characteristics of the traffic sample 408. In some embodiments, the sandbox 402 replicates, mimics, or approximates one or more characteristics of the intended destination of the traffic sample 408. Such characteristics may include operating systems, system configuration (e.g., traffic routes, open ports, software revisions, and the like), applications and related process running on the destination, data (e.g., customer data) resident on the on the destination, and the like.

At a time after applying the inputs to the traffic sample 408, the sandbox 402 compares the actual observed outputs (e.g., behaviors) with the expected outputs so as to determine the extent and nature of any differences between them. Based on this comparison, in some embodiments, the sandbox 402 may determine whether (or the likelihood that) the traffic sample 408 is malicious 410. In some embodiments, the sandbox 402 may use the extent and nature of the differences to vary, e.g., a likelihood or confidence of a determination of maliciousness 410. As may be contemplated, such determinations 410 may be used in connection with analysis of a risk analyzer 412, such as described in further detail in at least FIGS. 1 through 3.

For example, an initial determination by the sandbox 402 may induce a risk analyzer 412 to perform further analysis according to the techniques (e.g., application of risk classifiers) described in further detail above. As another example, the analysis of the sandbox 402 and the risk analyzer 412 may be used in parallel so as to generate a composite analysis, e.g., for increased accuracy. As yet another example, the comparison (as well as the observed and expected behaviors determined by the sandbox 402) made by the sandbox 402 may be used as training data for the various routines of the risk analyzer 412, which, as previously discussed, may implement various machine learning techniques to refine and improve the accuracy and/or confidence of the risk classifiers using such training data as inputs.

Figure 5:
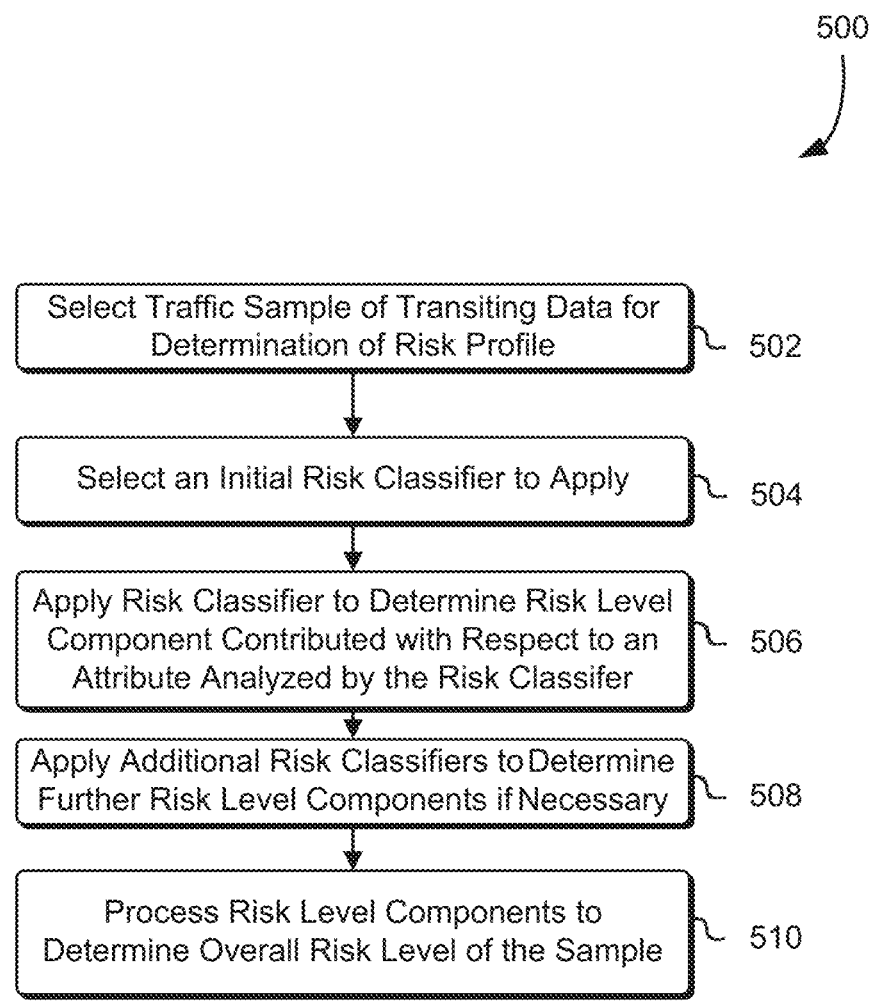
FIG. 5 schematically illustrates an example process for determining an overall risk level of a sample of transiting data, in accordance with some embodiments.

FIG. 5 schematically illustrates an example process 500 for determining an overall risk level of a sample of transiting data, in accordance with sonic embodiments. At step 502, a traffic sample, such as one or more network packets of a stream of network traffic, is selected by, e.g., a risk analyzer such as that described above in at least each of FIGS. 1 through 4, for determination of a risk profile or an overall risk level of that sample. As previously discussed, the determination of a risk profile or overall risk level of the traffic sample (e.g., quantum of transiting data) may be made by an entity of a computing resource service provider, such as a risk analyzer.

At step 504, the entity (e.g., the risk analyzer), selects an initial risk classifier to apply the selected traffic sample. The initial risk classifier may be one of a plurality of risk classifiers implemented by the entity. The initial risk classifier may be selected such that a threshold determination may be made as to whether the traffic sample is highly likely to be malicious, and if so, further analysis (e.g., by other risk classifiers) may be obviated.

At step 506, the initial risk classifier is applied, e.g., by the risk analyzer, so as to determine a risk level component for that risk classifier. As previously discussed, such as in connection with at least FIGS. 1 through 4, the risk level component may be calculated with respect to the attribute analyzed by the risk classifier, and in some embodiments, the weight and/or value of the risk level component for the initial risk classifier (or other risk classifiers, for that matter) may vary based on various factors, such as the specific threat environment known to the risk analyzer at the time of analysis.

At step 508, additional risk classifiers, e.g., of the risk analyzer, such as those interconnected with the initial risk classifier in a data structure such as a graph, may determine additional risk level components if, e.g., the initial risk classifier's risk level component does not necessarily indicate that the traffic sample is likely to be malicious. As previously discussed, the nature of the analysis of the a given additional risk classifier, as well as the value of the associated risk level component, may affect the analysis and/or the associated risk level component of other risk classifiers.

At step 510, the risk level component(s) generated in steps 506 and 508 are processed so as to generate an overall risk level of the traffic sample. For example, the risk level component(s) may be processed by the risk analyzer using a statistical or mathematical technique, such as those previously discussed (e.g., addition, normalization, etc.). Also as previously discussed, a plurality of generated overall risk levels may be combined for a plurality of analyzed traffic samples to generate a risk profile for the plurality (which, as previously discussed, may be considered a traffic flow.

Figure 6:
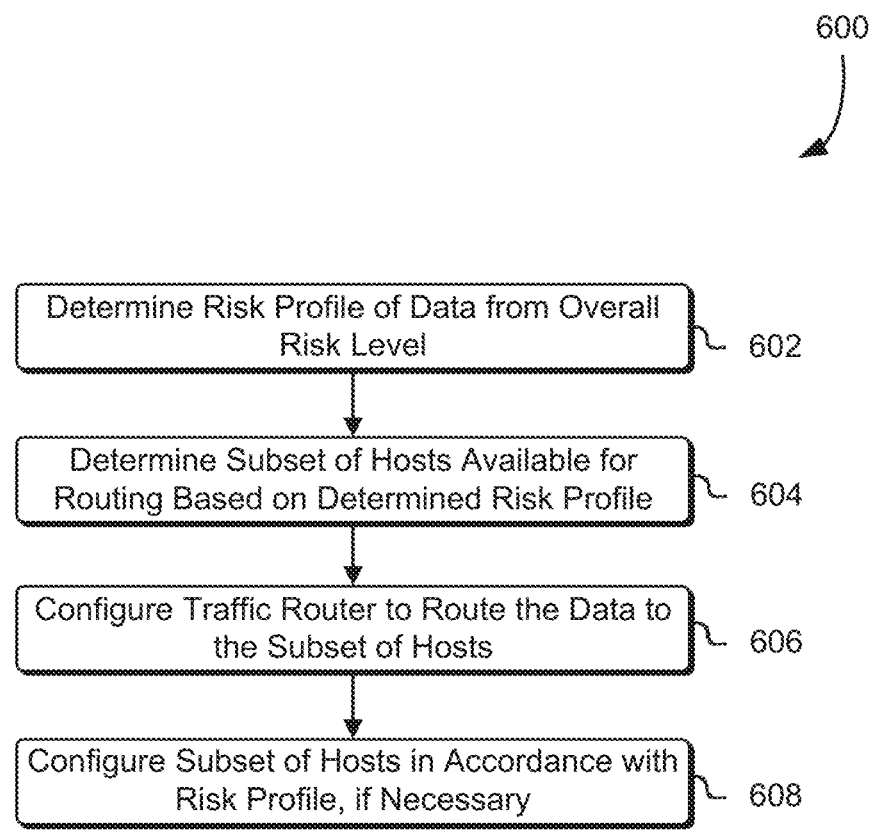
FIG. 6 schematically illustrates an example process for routing data based on risk profiles associated with the data, in accordance with some embodiments.

FIG. 6 schematically illustrates an example process 600 for routing data based on risk profiles associated with the data, in accordance with some embodiments. At step 602, a risk profile may be determined for a given traffic flow, e.g., by a risk analyzer or a traffic router, such as that of a computing resource service provider. For example, such as previously discussed, the overall risk level of each of the quanta (e.g., packets) of the traffic flow, such as may be generated by a risk analyzer, may be combined by, e.g., the risk analyzer, into a risk profile for the traffic flow.

At step 604, an entity, such as a traffic router as previously described in connection with FIGS. 1-4, may determine an appropriate subset of hosts to which to direct a traffic flow based on the risk profile determined or received in connection with step 602. As previously discussed, based on the risk profile, the entity (e.g., the traffic router) may determine which of either a general population of hosts or quarantined hosts that are isolated from the general population of hosts to which the associated traffic flow (or portion thereof) is to be routed. Also as previously discussed, a subset of such hosts (e.g., a subset of the general population of hosts) may be selected to receive the routed data, based on their isolation or other protection from other hosts handling sensitive or confidential data.

At step 606, the entity, such as the traffic router, is configured (e.g., by an implementing computing resource service provider, and/or by the traffic router itself), so as to route the traffic flow (or portion thereof) to the subset of hosts selected in step 604. Such configuration may include generating instructions or other information to send to the selected subset of hosts to handle the routed traffic flow in a specific fashion. For example, information regarding the type of malicious behavior suspected of the traffic flow may be generated at this step.

At step 608, if configuration information for the hosts is generated at step 606, any such information is passed to the associated subset of hosts by, e.g., the traffic router, so as to configure the subset of hosts for further processing of the routed traffic flow or portion thereof. For example, in the case that information regarding the type of malicious behavior is generated at step 606, such information may be passed to the subset of hosts (e.g., a set of quarantined hosts) so as cause those hosts to implement mitigation measures in response to that information.

Figure 7:
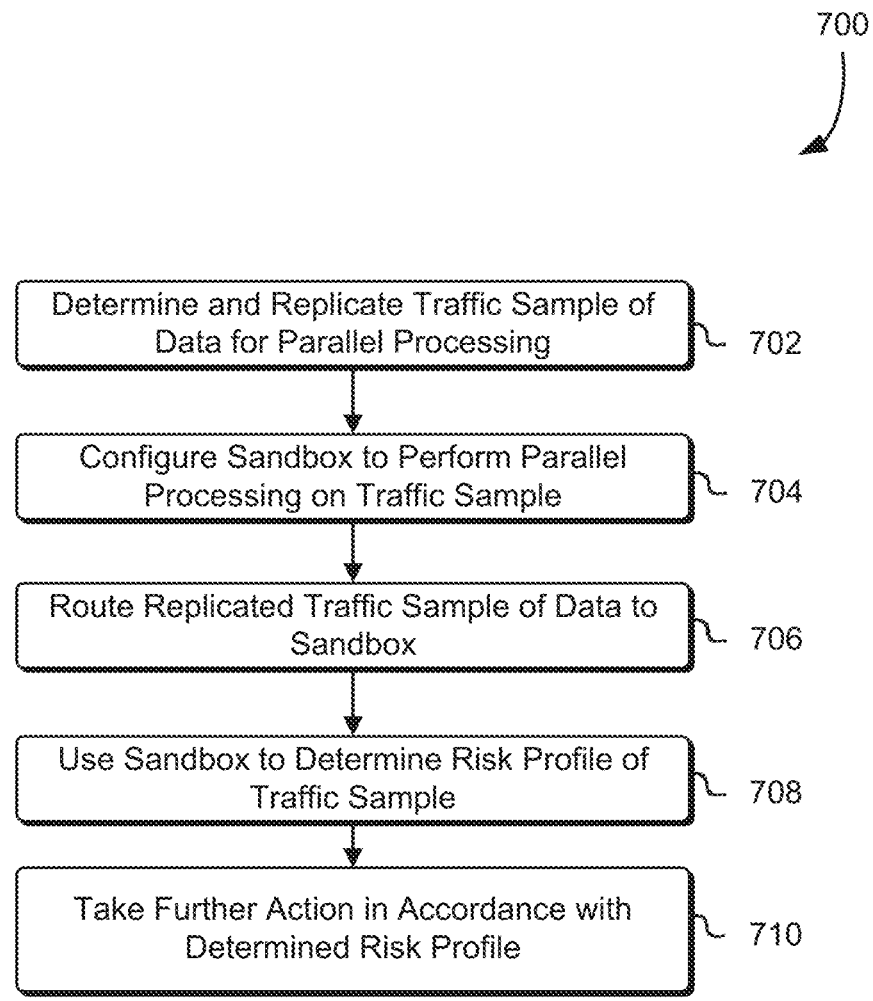
FIG. 7 schematically illustrates an example process for processing a traffic sample of data in a sandbox, in accordance with some embodiments.

FIG. 7 schematically illustrates an example process 700 for processing a traffic sample of data in a sandbox, in accordance with some embodiments. At step 702, a traffic sample, such as one or more network packets, of a flow of transiting data (e.g., a traffic flow) is selected and determined so as to be subject to further processing in parallel to the normal flow of the transiting data. In some embodiments, a sandbox, such as that described above in connection with at least FIGS. 1 through 4, may be implemented to determine, e.g., the extent of the traffic sample, select the traffic sample from the flow of transiting data, and/or perform the processing described herein and in connection with other steps in process 700.

At step 704, the sandbox is configured, such as by a resource of a computing resource service provider, to perform the parallel processing on the selected traffic sample. Such configuration may include determination, such as by the resource or by the sandbox itself, of the nature of the traffic sample, and further, appropriate inputs to be applied to the traffic sample (and expected outputs for those inputs).

At step 706, the selected traffic sample is routed to the sandbox for processing, such as by a traffic router or other entity of a computing resource service provider capable of redirecting a portion of network traffic. Thereafter, at step 708, the sandbox performs the parallel processing upon the traffic sample. As previously discussed, the parallel processing may include applying inputs, such as those determined in connection with step 704, to the traffic sample, so as to compare the observed outputs with expected outputs, which may also have been determined in connection with step 704. As previously discussed, the nature and extent of the differences determined as part of the comparison may be used by, e.g., the sandbox, to further determine a risk profile or other risk level-related information of the traffic sample. In some embodiments, the risk level-related information determined for the traffic sample may be used by, e.g., the sandbox, or other entity of the computing resource service provider, to infer or extrapolate a risk profile for some or all of the transiting data from which the traffic sample was selected in connection with step 702.

At step 710, further action may be taken in accordance with the determined risk level-related information or risk profile. For example, the sandbox may provide said information to a risk analyzer so as to initiate further analysis of the transiting data from which the network sample derived. As another example, the sandbox may provide said information to a traffic router so as to route the some or all of the transiting data in accordance with the process 600 described above in connection with at least FIG. 6. As a further example, the information may be used by, e.g., the risk analyzer, to train risk classifiers using machine learning techniques.

Figure 8:
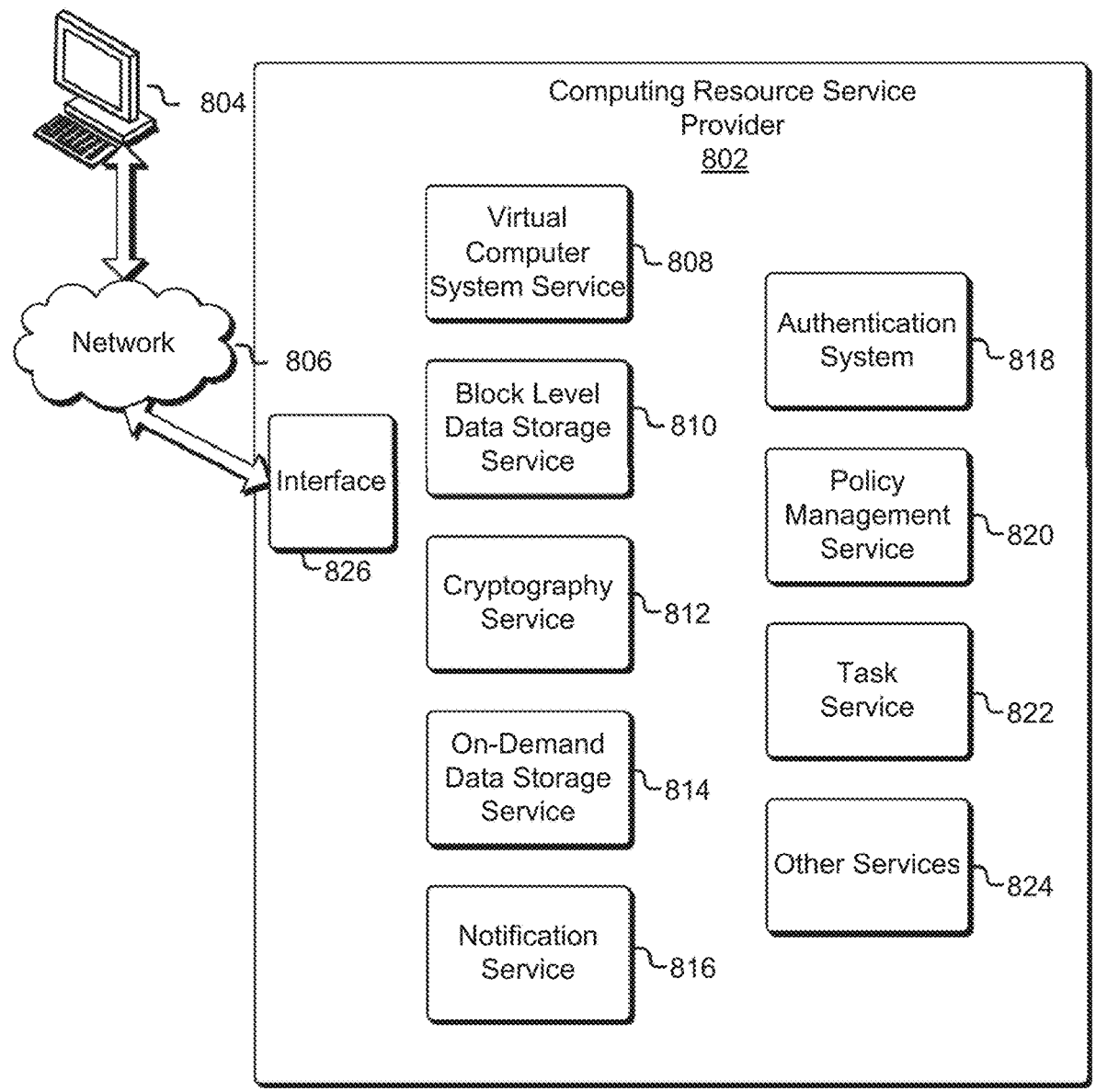

FIG. 8 shows an example 800 of a customer connected to a computing resource service provider in accordance with at least one embodiment. The computing resource service provider 802 may provide a variety of services to the customer 804 and the customer 804 may communicate with the computing resource service provider 802 via an interface 826, which may be a web services interface or any other type of customer interface. While FIG. 8 shows one interface 826 for the services of the computing resource service provider 802, each service may have its own interface and, generally, subsets of the services may have corresponding interfaces in addition to or as an alternative to the interface 826. The customer 804 may be an organization that may utilize one or more of the services provided by the computing resource service provider 802 to maintain and deliver information to its employees, which may be located in various geographical locations. Additionally, the customer 804 may be an individual that utilizes the services of the computing resource service provider 802 to deliver content to a working group located remotely. As shown in FIG. 8, the customer 804 may communicate with the computing resource service provider 802 through a network 806, whereby the network 806 may be a communication network, such as the Internet, an intranet or an Internet service provider (ISP) network. Some communications from the customer 804 to the computing resource service provider 802 may cause the computing resource service provider 802 to operate in accordance with one or more embodiments described or a variation thereof.

The computing resource service provider 802 may provide various computing resource services to its customers. The services provided by the computing resource service provider 802, in this example, include a virtual computer system service 808, a block-level data storage service 810, a cryptography service 812, an on-demand data storage service 814, a notification service 816, an authentication system 818, a policy management service 820, a task service 822 and one or more other services 824. It is noted that not all embodiments described include the services 808-824 described with reference to FIG. 8 and additional services may be provided in addition to or as an alternative to services explicitly described. As described, each of the services 808-824 may include one or more web service interfaces that enable the customer 804 to submit appropriately configured API calls to the various services through web service requests. In addition, each of the services may include one or more service interfaces that enable the services to access each other (e.g., to enable a virtual computer system of the virtual computer system service 808 to store data in or retrieve data from the on-demand data storage service 814 and/or to access one or more block-level data storage devices provided by the block level data storage service 810).

The virtual computer system service 808 may be a collection of computing resources configured to instantiate virtual machine instances on behalf of the customer 804. The customer 804 may interact with the virtual computer system service 808 (via appropriately configured and authenticated API calls) to provision and operate virtual computer systems that are instantiated on physical computing devices hosted and operated by the computing resource service provider 802. The virtual computer systems may be used for various purposes, such as to operate as servers supporting a website, to operate business applications or, generally, to serve as computing power for the customer. Other applications for the virtual computer systems may be to support database applications, electronic commerce applications, business applications, and/or other applications. Although the virtual computer system service 808 is shown in FIG. 8, any other computer system or computer system service may be utilized in the computing resource service provider 802, such as a computer system or computer system service that does not employ virtualization or instantiation and instead provisions computing resources on dedicated or shared computers/servers and/or other physical devices.

The block-level data storage service 810 may comprise one or more computing resources that collectively operate to store data for a customer 804 using block-level storage devices (and/or virtualizations thereof). The block-level storage devices of the block-level data storage service 810 may, for instance, be operationally attached to virtual computer systems provided by the virtual computer system service 808 to serve as logical units (e.g., virtual drives) for the computer systems. A block-level storage device may enable the persistent storage of data. used/generated by a corresponding virtual computer system where the virtual computer system service 808 may only provide ephemeral data storage.

The computing resource service provider 802 also includes a cryptography service 812 The cryptography service 812 may utilize one or more storage services of the computing resource service provider 802 to store keys of the customers in encrypted form, whereby the keys may be usable to decrypt customer keys accessible only to particular devices of the cryptography service 812.

The computing resource service provider 802 further includes an on-demand data storage service 814. The on-demand data storage service 814 may be a collection of computing resources configured to synchronously process requests to store and/or access data. The on-demand data storage service 814 may operate using computing resources (e.g., databases) that enable the on-demand data storage service 814 to locate and retrieve data quickly, to allow data to be provided in responses to requests for the data. For example, the on-demand data storage service 814 may maintain stored data in a manner such that, when a request for a data object is retrieved, the data object can be provided (or streaming of the data object can be initiated) in a response to the request. As noted, data stored in the on-demand data storage service 814 may be organized into data objects. The data objects may have arbitrary sizes except, perhaps, for certain constraints on size. Thus, the on-demand data storage service 814 may store numerous data objects of varying sizes. The on-demand data storage service 814 may operate as a key value store that associates data objects with identifiers of the data objects that may be used by the customer 804 to retrieve or perform other operations in connection with the data objects stored by the on-demand data storage service 814.

In the environment illustrated in FIG. 8, a notification service 816 is included. The notification service 816 may comprise a collection of computing resources collectively configured to provide a web service or other interface and browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol (HTTP), e-mail and short message service (SMS), among others). The notification service 816 may provide notifications to clients using a "push" mechanism without the need to check periodically or "poll" for new information and updates. The notification service 816 may further be used for various purposes such as monitoring applications executing in the virtual computer system service 808, workflow systems, time-sensitive information updates, mobile applications, and many others.

As illustrated in FIG. 8, the computing resource service provider 802, in various embodiments, includes an authentication system 818 and a policy management service 820. The authentication system 818, in an embodiment, is a computer system (i.e., collection of computing resources) configured to perform operations involved in authentication of users of the customer. For instance, one of the services 808-816 and 820-824 may provide information from a user to the authentication system 818 to receive information in return that indicates whether the user requests are authentic.

The policy management service 820, in an embodiment, is a computer system configured to manage policies on behalf of customers (such as customer 804) of the computing resource service provider 802. The policy management service 820 may include an interface that enables customers to submit requests related to the management of policy. Such requests may, for instance, be requests to add, delete, change, or otherwise modify policy for a customer or for other administrative actions, such as providing an inventory of existing policies and the like.

The computing resource service provider 802, in various embodiments, is also equipped with a task service 822. The task service 822 is configured to receive a task package from the customer 804 and enable executing tasks as dictated by the task package. The task service 822 may be configured to use any resource of the computing resource service provider 802, such as one or more instantiated virtual machines or virtual hosts, for executing the task. The task service 822 may configure the one or more instantiated virtual machines or virtual hosts to operate using a selected operating system and/or a selected execution application in accordance with a requirement of the customer 804.

The computing resource service provider 802 additionally maintains one or more other services 824 based at least in part on the needs of its customers 804. For instance, the computing resource service provider 802 may maintain a database service for its customers 804. A database service may be a collection of computing resources that collectively operate to run one or more databases for one or more customers 804. The customer 804 may operate and manage a database from the database service by utilizing appropriately configured API calls. This, in turn, may allow a customer 804 to maintain and potentially scale the operations in the database. Other services include, but are not limited to, object-level archival data storage services, services that manage and/or monitor other services.

As used, unless otherwise stated or clear from context, the term "service" may be understood to be a computer system program, process, client, server, service, application, module, operating system entity, controlling domain, communication node or collection of these and/or other such computer system entities. A "service" may be a client and/or a server and in some embodiments may be configured to send and/or receive communications, data, requests, and/or other such requests from other services within the computer system.

Figure 9:
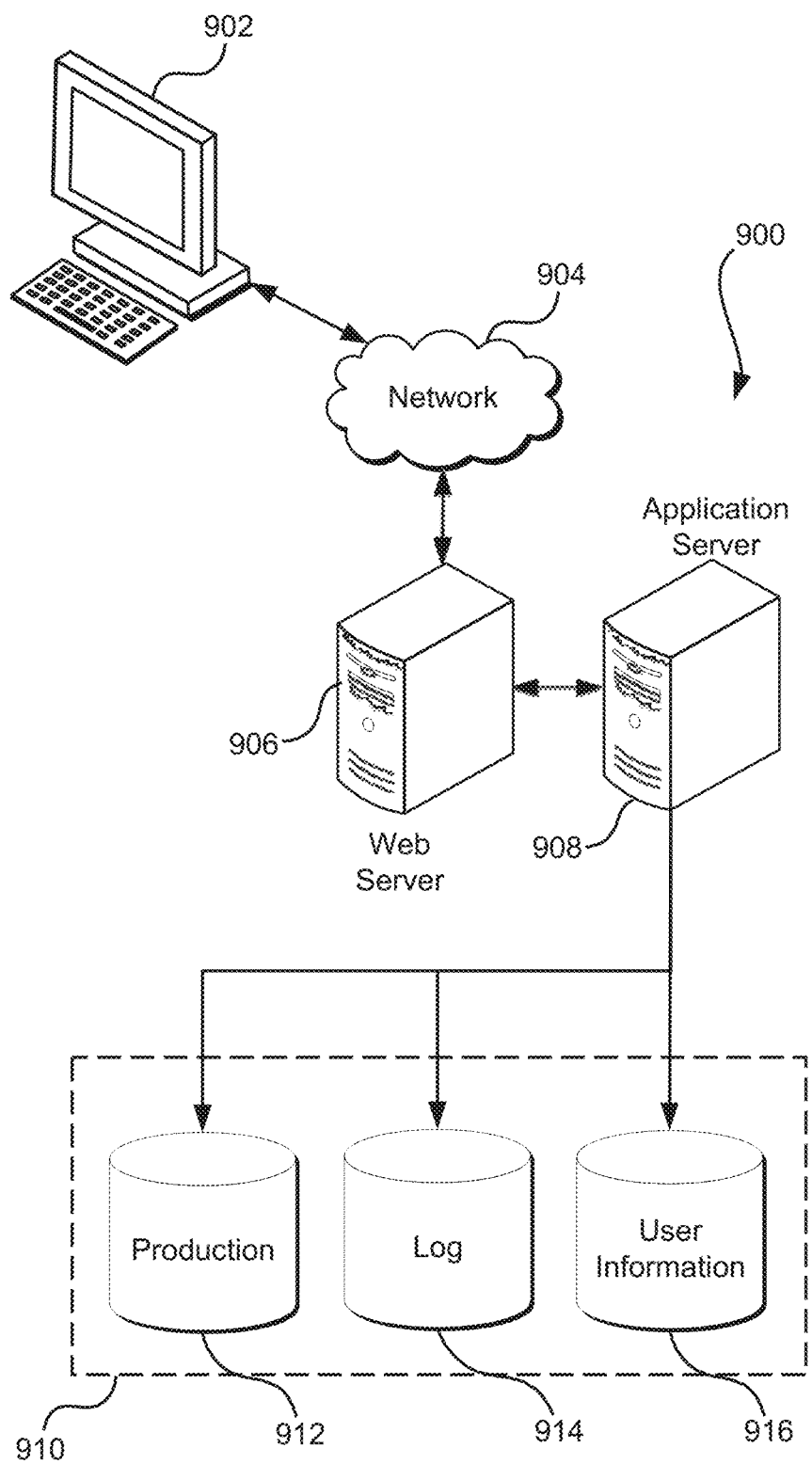
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in sonic cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDI'"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The servers) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate, Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above, For example, customized hardware might also be used aid/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a. nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise dearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention, Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   generating a traffic sample from data transiting from a source to a destination on a network;
   generating a replicated traffic sample from the traffic sample;
   processing the replicated traffic sample by at least comparing an expected behavior of the replicated traffic sample with an observed behavior of the replicated traffic sample and based at least in part on a characteristic of the destination;
   sending the comparison of the expected behavior of the replicated traffic sample and the observed behavior of the replicated traffic sample to a risk analyzer; and
   initiating a mitigation measure for the data based at least in part on the observed behavior differing from the expected behavior.

2. The computer-implemented method of claim 1, further comprising generating one or more of risk level components that are dependent on outcomes associated with other risk level components generated from a plurality of risk classifiers.

3. The computer-implemented method of claim 2, further comprising removing a risk classifier from the plurality of risk classifiers based at least in part on the one or more risk level components.

4. The computer-implemented method of claim 1, further comprising:
   determining a plurality of attributes of the traffic sample; and
   generating a plurality of risk level components based at least in part on the plurality of attributes and the traffic sample.

5. A system comprising:
   at least one computing device that implements one or more services, wherein the one or more services:
   generate a replicated traffic sample from a traffic sample;
   compare an expected behavior of the replicated traffic sample to an observed behavior of the replicated traffic sample;
   provide the comparison of the expected behavior of the replicated traffic sample and the observed behavior of the replicated traffic sample to a risk analyzer; and
   initiate a mitigation measure for data associated with the replicated traffic sample based at least in part on the observed behavior differing from the expected behavior.

6. The system of claim 5, wherein the one or more services further remove a risk classifier from a plurality of risk classifiers based at least in part on one or more risk level components.

7. The system of claim 6, wherein the one or more services further generate the one or more risk level components.

8. The system of claim 6, wherein the one or more risk level components are dependent on outcomes associated with other risk level components.

9. The system of claim 8, wherein the other risk level components are generated from the plurality of risk classifiers.

10. The system of claim 6, wherein the one or more services further determine a plurality of attributes of the replicated traffic sample, including one or more of:
    network protocol, packet integrity, source reputation destination status and packet content; and
    generate a plurality of risk level components based at least in part on the plurality of attributes, the respective plurality of risk level components associated with outcomes corresponding to other risk level components generated from a plurality of risk classifiers.

11. A non-transitory computer-readable storage medium having stored thereon executable instructions that, upon execution by one or more processors of a computer system, cause the computer system to at least:
    determine, from data transiting from a source to a destination on a network associated with the computer system, a traffic sample;
    generate a replicated traffic sample from the traffic sample;
    process, based at least in part on a characteristic of the destination, the replicated traffic sample by at least comparing an expected behavior of the replicated traffic sample with an observed behavior of the replicated traffic sample;
    provide the comparison of the expected behavior of the replicated traffic sample and the observed behavior of the replicated traffic sample to a risk analyzer; and
    based at least in part on the observed behavior differing from the expected behavior, initiate a mitigation measure for the data.

12. The non-transitory computer-readable storage medium of claim 11, wherein the instructions further cause the computer system to generate one or more of risk level components.

13. The non-transitory computer-readable storage medium of claim 12, wherein the instructions further cause the computer system to remove a risk classifier from a plurality of risk classifiers based at least in part on the one or more risk level components.

14. The non-transitory computer-readable storage medium of claim 13, wherein the one or more risk level components are dependent on outcomes associated with other risk level components.

15. The non-transitory computer-readable storage medium of claim 13, wherein the other risk level components are generated from the plurality of risk classifiers.

16. The non-transitory computer-readable storage medium of claim 11, wherein the instructions further cause the computer system to provide an input into the replicated traffic sample using the characteristic so as to generate the observed behavior.

17. The non-transitory computer-readable storage medium of claim 11, wherein the instructions further cause the computer system to train one or more risk classifiers based at least in part on a comparison of the expected behavior and the observed behavior.

* * * * *